(12) United States Patent
Kojima

(10) Patent No.: US 12,404,350 B2
(45) Date of Patent: Sep. 2, 2025

(54) METHOD FOR PRODUCING NITRILE RUBBER

(71) Applicant: ZEON CORPORATION, Tokyo (JP)

(72) Inventor: Keisuke Kojima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 406 days.

(21) Appl. No.: 17/802,497

(22) PCT Filed: Feb. 4, 2021

(86) PCT No.: PCT/JP2021/004148
§ 371 (c)(1),
(2) Date: Aug. 25, 2022

(87) PCT Pub. No.: WO2021/171952
PCT Pub. Date: Sep. 2, 2021

(65) Prior Publication Data
US 2023/0092267 A1    Mar. 23, 2023

(30) Foreign Application Priority Data
Feb. 28, 2020    (JP) .................. 2020-033534

(51) Int. Cl.
| | |
|---|---|
| C08C 1/15 | (2006.01) |
| B29C 48/00 | (2019.01) |
| B29C 48/395 | (2019.01) |
| C08J 3/16 | (2006.01) |
| C08K 5/13 | (2006.01) |
| C08L 33/20 | (2006.01) |
| B29K 33/18 | (2006.01) |

(52) U.S. Cl.
CPC .............. *C08C 1/15* (2013.01); *B29C 48/022* (2019.02); *B29C 48/397* (2019.02); *C08J 3/16* (2013.01); *C08K 5/13* (2013.01); *C08L 33/20* (2013.01); *B29K 2033/18* (2013.01)

(58) Field of Classification Search
CPC ....... C08L 33/20; C08L 9/02; B29K 2033/18; B29C 48/397; B29C 48/40; C08K 5/13; C08K 5/1345; C08C 1/15
See application file for complete search history.

(56) References Cited

U.S. PATENT DOCUMENTS

2021/0002391 A1    1/2021 Yoshimura et al.

FOREIGN PATENT DOCUMENTS

| CN | 103497376 A | 1/2014 |
|---|---|---|
| JP | H09-216981 A | 8/1997 |

(Continued)

OTHER PUBLICATIONS

Feb. 9, 2024 Extended European Search Report Issued in European Patent Application No. 21759803.6.
(Continued)

*Primary Examiner* — Catherine S Branch
*Assistant Examiner* — Huihong Qiao
(74) *Attorney, Agent, or Firm* — Oliff PLC

(57) ABSTRACT

A method for producing a nitrile rubber, includes recovering a nitrile rubber from a latex of nitrile rubber by continuously feeding the latex of nitrile rubber and a coagulant into an extruder including a screw disposed inside a barrel to be rotatably driven, wherein the latex of nitrile rubber fed into the extruder contains 0.1 to 3 parts by weight of a hindered phenol-based antiaging agent having a molecular weight of 300 to 3000 relative to 100 parts by weight of the nitrile rubber.

6 Claims, 5 Drawing Sheets

(56) References Cited

FOREIGN PATENT DOCUMENTS

| | | | |
|---|---|---|---|
| JP | 2001-247754 | A | 9/2001 |
| JP | 2011-012142 | A | 1/2011 |
| JP | 2016-216645 | A | 12/2016 |
| TW | 201940566 | A | 10/2019 |
| WO | 2006/101235 | A1 | 9/2006 |

OTHER PUBLICATIONS

Mar. 23, 2021 International Search Report issued in International Patent Application No. PCT/JP2021/004148.
Aug. 30, 2022 International Preliminary Report on Patentability issued in International Patent Application No. PCT/JP2021/004148.
Jan. 22, 2025 Office Action issued in Indian Patent Application No. 202217048200.

METHOD FOR PRODUCING NITRILE RUBBER

TECHNICAL FIELD

The present invention relates to a method for producing a nitrile rubber using an extruder including a screw disposed inside a barrel to be rotatably driven, and more specifically relates to a method for producing a nitrile rubber which can effectively suppress occurrence of fouling in an extruder and fouling of a metal mold used during forming, and can produce a nitrile rubber having high processability.

BACKGROUND ART

In general, a polymer is recovered from a polymer latex prepared through emulsion polymerization as follows: first, for example, a coagulant such as an aqueous solution of an acid or an inorganic salt is added to the latex of a polymer in the coagulation tank, and the latex is coagulated with stirring. In the next step, polymer crumbs prepared in this coagulation operation are introduced into a dewatering apparatus such as a centrifugal dehydrator or a squeezer to dewater the polymer crumbs, and then the dewatered polymer crumbs are introduced into a drying apparatus such as a band dryer, an air flow dryer, or an extrusion dryer to be dried. Downstream of the drying apparatus, usually, a pelletizer or a baler is connected, and the polymer after drying is often finally processed into a commercialized product in the form of a pellet, a vale, or a sheet.

However, if these dewatering/drying apparatuses are used to recover the polymer from the polymer latex, not only the number of steps increases, but also the apparatus cost of the coagulation tank and incidental facilities becomes high, and the installation space increases, thus leading to many problems.

To solve such problems, for example, as an attempt, Patent Document 1 discloses a method of directly feeding a latex of a nitrile rubber and a coagulant into a screw extruder, and performing coagulation, dewatering, and drying inside the extruder. However, in the method according to Patent Document 1, fouling is likely to occur in the extruder used in coagulation, dewatering, and drying (fouling is likely to occur in the vent pots of the extruder in particular), leading to insufficient productivity, and the resulting nitrile rubber has insufficient processability.

RELATED ART

Patent Document

Patent Document 1: Japanese Patent Application Laid-Open No. 2011-12142

SUMMERY OF THE INVENTION

Problems to be Solved by Invention

The present invention has been made in consideration of such circumstances, and an object of the present invention is to provide a method for producing a nitrile rubber, comprising recovering a nitrile rubber from a latex of nitrile rubber using an extruder including a screw disposed inside a barrel to be rotatably driven, the method enabling effective suppression of occurrence of fouling in the extruder and fouling in a metal mold used during forming, and enabling production of a nitrile rubber having high processability.

Means for Solving Problems

The present inventor, who has conducted extensive research to achieve the above object, has found that the above object can be achieved by recovery of the nitrile rubber from the latex of nitrile rubber by continuously feeding the latex of nitrile rubber and a coagulant into an extruder including a screw disposed inside a barrel to be rotatably driven while the latex of nitrile rubber fed to the extruder contains a specific amount of a hindered phenol-based antiaging agent having a molecular weight of 300 to 3000, and thus has completed the present invention.

In other words, the present invention is a method for producing a nitrile rubber, comprising recovering a nitrile rubber from a latex of nitrile rubber by continuously feeding the latex of nitrile rubber and a coagulant into an extruder including a screw disposed inside a barrel to be rotatably driven, wherein the latex of nitrile rubber fed to the extruder contains 0.1 to 3 parts by weight of a hindered phenol-based antiaging agent having a molecular weight of 300 to 3000 relative to 100 parts by weight of the nitrile rubber.

In the production method according to the present invention, preferably, the nitrile rubber discharged from the extruder and recovered from the latex of nitrile rubber has a maximum value of chemiluminescent intensity of 2,000 to 25,000 counts/sec, which is measured according to JIS K7351:2018.

In the production method according to the present invention, preferably, the nitrile rubber contains 5 to 60 wt % of $\alpha,\beta$-ethylenically unsaturated nitrile monomer units, and has an iodine value of 120 or less.

In the production method according to the present invention, preferably, the ratio Q/N [kg/(hr·rpm)] of the feed rate Q [kg/hr] of the nitrile rubber to the extruder to the number N of rotations [rpm] of the screw in the extruder is controlled to 0.22 kg/(hr·rpm) or less.

The production method according to the present invention preferably comprises adding the hindered phenol-based antiaging agent in the form of an emulsion to the latex of nitrile rubber.

Effect of Invention

The present invention provides a method for producing a nitrile rubber using an extruder including a screw disposed inside a barrel to be rotatably driven, the method enabling effective suppression of occurrence of fouling in the extruder and fouling in a metal mold used during forming, and enabling production of a nitrile rubber having high processability.

DESCRIPTION OF EMBODIMENT

Figure 1:
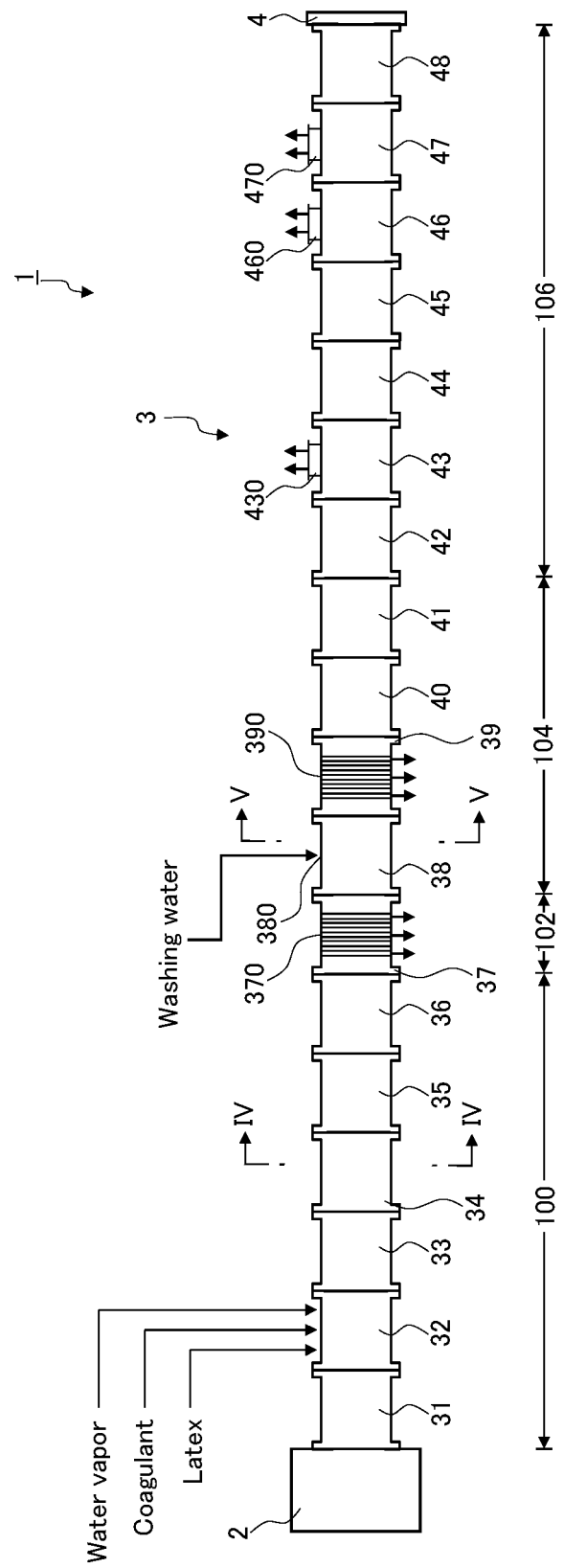
FIG. 1 is a schematic view showing an extruder used in a method of recovering a nitrile rubber according to a first embodiment of the present invention.

The method for producing a nitrile rubber according to the present invention is
a method for producing a nitrile rubber, comprising recovering the nitrile rubber from a latex of nitrile rubber by continuously feeding the latex of nitrile rubber and a coagulant into an extruder including a screw disposed inside a barrel to be rotatably driven, wherein the latex of nitrile rubber fed into the extruder contains 0.1 to 3 parts by weight of a hindered phenol-based antiaging agent having a molecular weight of 300 to 3000 relative to 100 parts by weight of the nitrile rubber.

<Nitrile Rubber>

First, the nitrile rubber used in the present invention will be described.

Examples of the nitrile rubber used in the present invention include, but should not be limited to, copolymers prepared by copolymerizing an $\alpha,\beta$-ethylenically unsaturated nitrile monomer, a conjugated diene monomer, and different monomers which are copolymerizable with these and are optionally used.

The $\alpha,\beta$-ethylenically unsaturated nitrile monomer can be any $\alpha,\beta$-ethylenically unsaturated compound as long as it has a nitrile group. Examples thereof include acrylonitrile; $\alpha$-halogenoacrylonitriles such as $\alpha$-chloroacrylonitrile and $\alpha$-bromoacrylonitrile; $\alpha$-alkylacrylonitriles such as methacrylonitrile; and the like. Preferred is acrylonitrile. These $\alpha,\beta$-ethylenically unsaturated nitrile monomers may be used alone or in combination.

The content of $\alpha,\beta$-ethylenically unsaturated nitrile monomer units in the nitrile rubber used in the present invention is preferably 5 to 60 wt %, more preferably 8 to 55 wt %, still more preferably 10 to 50 wt %, further still more preferably 15 to 25 wt %. Control of the content of $\alpha,\beta$-ethylenically unsaturated nitrile monomer units to the above ranges results in a cross-linked rubber having oil resistance and cold resistance well balanced.

As the conjugated diene monomer, preferred are $C_4$ to $C_6$ conjugated diene monomers such as 1,3-butadiene, isoprene, 2,3-dimethyl-1,3-butadiene, 1,3-pentadiene, and chloroprene, more preferred are 1,3-butadiene and isoprene, and particularly preferred is 1,3-butadiene. These may be used alone or in combination.

The content of conjugated diene monomer units (including saturated butadiene units) in the nitrile rubber used in the present invention is preferably 10 to 89.9 wt %, more preferably 15 to 81.5 wt %, still more preferably 20 to 74 wt %, further still more preferably 32.5 to 59.5 wt %. Control of the content of conjugated diene monomer units to the above ranges results in a cross-linked rubber having high oil resistance, heat aging resistance, and chemical resistance stability while having appropriately increased rubber elasticity.

Preferably, the nitrile rubber used in the present invention is prepared by copolymerizing a carboxyl group-containing monomer with the $\alpha,\beta$-ethylenically unsaturated nitrile monomer and the conjugated diene monomer. The carboxyl group-containing monomer copolymerized with the above-mentioned monomers can enhance the compression set resistance of the resulting cross-linked rubber.

The carboxyl group-containing monomer can be any monomer which is copolymerizable with the $\alpha,\beta$-ethylenically unsaturated nitrile monomer and has one or more unsubstituted (free) carboxyl groups not subjected to esterification or the like.

Examples of the carboxyl group-containing monomer include $\alpha,\beta$-ethylenically unsaturated monocarboxylic acid monomers, $\alpha,\beta$-ethylenically unsaturated polyvalent carboxylic acid monomers, $\alpha,\beta$-ethylenically unsaturated dicarboxylic acid monoester monomers, and the like. The carboxyl group-containing monomer is intended to encompass those having carboxyl groups in the form of carboxylic acid salts. Furthermore, anhydrides of the $\alpha,\beta$-ethylenically unsaturated polyvalent carboxylic acids can also be used as the carboxyl group-containing monomer because their acid anhydride groups can be cleaved to form carboxyl groups after copolymerization.

Examples of the $\alpha,\beta$-ethylenically unsaturated monocarboxylic acid monomers include acrylic acid, methacrylic acid, ethylacrylic acid, crotonic acid, cinnamic acid, and the like.

Examples of the $\alpha,\beta$-ethylenically unsaturated polyvalent carboxylic acid monomers include butenedioic acids such as fumaric acid and maleic acid, itaconic acid, citraconic acid, mesaconic acid, glutaconic acid, allylmalonic acid, teraconic acid, and the like. Examples of the anhydrides of the $\alpha,\beta$-unsaturated polyvalent carboxylic acids include maleic anhydride, itaconic anhydride, citraconic anhydride, and the like.

Examples of the $\alpha,\beta$-ethylenically unsaturated dicarboxylic acid monoester monomers include maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate and monoethyl cyclohexyl itaconate; and the like.

These carboxyl group-containing monomers may be used alone or in combination. Among these, preferred are $\alpha,\beta$-ethylenically unsaturated dicarboxylic acid monoester monomers, more preferred are $\alpha,\beta$-ethylenically unsaturated dicarboxylic acid monoalkyl ester monomers, still more preferred are maleic acid monoalkyl esters, and particularly preferred is mono-n-butyl maleate. The alkyl group in the alkyl esters preferably has 2 to 8 carbon atoms.

The content of carboxyl group-containing monomer units in the nitrile rubber used in the present invention is preferably 0.1 to 20 wt %, more preferably 0.5 to 15 wt %, still more preferably 1 to 10 wt %, further still more preferably 2.5 to 7.5 wt %. Control of the content of carboxyl group-containing monomer units to the above ranges results in a cross-linked rubber having more favorable mechanical properties and compression set resistance.

To further enhance cold resistance, the nitrile rubber used in the present invention is preferably prepared by copolymerizing an α,β-ethylenically unsaturated monocarboxylic acid ester monomer in addition to the α,β-ethylenically unsaturated nitrile monomer, the conjugated diene monomer, and the carboxyl group-containing monomer optionally used.

Examples of the α,β-ethylenically unsaturated monocarboxylic acid ester monomer include, but should not be limited to, α,β-ethylenically unsaturated monocarboxylic acid alkyl ester monomers, α,β-ethylenically unsaturated monocarboxylic acid alkoxyalkyl ester monomers, α,β-ethylenically unsaturated monocarboxylic acid aminoalkyl ester monomers, α,β-ethylenically unsaturated monocarboxylic acid hydroxyalkyl ester monomers, α,β-ethylenically unsaturated monocarboxylic acid fluoroalkyl ester monomers, and the like. Among these, preferred are α,β-ethylenically unsaturated monocarboxylic acid alkyl ester monomers or α,β-ethylenically unsaturated monocarboxylic acid alkoxyalkyl ester monomers.

Among α,β-ethylenically unsaturated monocarboxylic acid alkyl esters, those having a $C_3$ to $C_{10}$ alkyl group are preferred, those having a $C_3$ to $C_8$ alkyl group are more preferred, and those having a $C_4$ to $C_6$ alkyl group are still more preferred.

Specific examples of the α,β-ethylenically unsaturated monocarboxylic acid alkyl ester monomers include acrylic acid alkyl ester monomers such as methyl acrylate, ethyl acrylate, propyl acrylate, isobutyl acrylate, n-butyl acrylate, n-pentyl acrylate, 2-ethylhexyl acrylate, and n-dodecyl acrylate; acrylic acid cycloalkyl ester monomers such as cyclopentyl acrylate and cyclohexyl acrylate; acrylic acid alkyl cycloalkyl ester monomers such as methylcyclopentyl acrylate, ethylcyclopentyl acrylate, and methylcyclohexyl acrylate; methacrylic acid alkyl ester monomers such as methyl methacrylate, ethyl methacrylate, propyl methacrylate, n-butyl methacrylate, n-pentyl methacrylate, and n-octyl methacrylate; methacrylic acid cycloalkyl ester monomers such as cyclopentyl methacrylate, cyclohexyl methacrylate, and cyclopentyl methacrylate; methacrylic acid alkyl cycloalkyl ester monomers such as methylcyclopentyl methacrylate, ethylcyclopentyl methacrylate, and methylcyclohexyl methacrylate; crotonic acid alkyl ester monomers such as propyl crotonate, n-butyl crotonate, and 2-ethylhexyl crotonate; crotonic acid cycloalkyl ester monomers such as cyclopentyl crotonate, cyclohexyl crotonate, and cyclooctyl crotonate; crotonic acid alkyl cycloalkyl ester monomers such as methylcyclopentyl crotonate and methylcyclohexyl crotonate; and the like.

The α,β-ethylenically unsaturated monocarboxylic acid alkoxyalkyl ester monomers are preferably those having a $C_2$ to $C_8$ alkoxyalkyl group, more preferably those having a $C_2$ to $C_6$ alkoxyalkyl group, still more preferably those having a $C_2$ to $C_4$ alkoxyalkyl group.

Specific examples of the α,β-ethylenically unsaturated monocarboxylic acid alkoxyalkyl ester monomers include acrylic acid alkoxyalkyl ester monomers such as methoxymethyl acrylate, methoxyethyl acrylate, methoxybutyl acrylate, ethoxymethyl acrylate, ethoxyethyl acrylate, ethoxypropyl acrylate, ethoxydodecyl acrylate, n-propoxyethyl acrylate, i-propoxyethyl acrylate, n-butoxyethyl acrylate, i-butoxyethyl acrylate, t-butoxyethyl acrylate, methoxypropyl acrylate, and methoxybutyl acrylate; methacrylic acid alkoxyalkyl ester monomers such as methoxymethyl methacrylate, methoxyethyl methacrylate, methoxybutyl methacrylate, ethoxymethyl methacrylate, ethoxyethyl methacrylate, ethoxypentyl methacrylate, n-propoxyethyl methacrylate, i-propoxyethyl methacrylate, n-butoxyethyl methacrylate, i-butoxyethyl methacrylate, t-butoxyethyl methacrylate, methoxypropyl methacrylate, and methoxybutyl methacrylate; and the like.

Among these α,β-ethylenically unsaturated monocarboxylic acid ester monomers, preferred are acrylic acid alkyl ester monomers and acrylic acid alkoxyalkyl ester monomers, and more preferred are n-butyl acrylate and methoxyethyl acrylate. These α,β-ethylenically unsaturated monocarboxylic acid ester monomers can also be used in combination.

These α,β-ethylenically unsaturated monocarboxylic acid ester monomers may be used alone or in combination. The content of α,β-ethylenically unsaturated monocarboxylic acid ester monomer units in the nitrile rubber used in the present invention is preferably 5 to 60 wt %, more preferably 10 to 55 wt %, still more preferably 15 to 50 wt %, further still more preferably 23 to 35 wt %. Control of the content of α,β-ethylenically unsaturated monocarboxylic acid ester monomer units to the above ranges results in a cross-linked rubber having more appropriately enhanced cold resistance.

The nitrile rubber used in the present invention may be prepared by copolymerizing the α,β-ethylenically unsaturated nitrile monomer, the conjugated diene monomer, the carboxyl group-containing monomer, and the α,β-ethylenically unsaturated monocarboxylic acid ester monomer with a different monomer copolymerizable therewith. Examples of such a different monomer include α,β-ethylenically unsaturated monocarboxylic acid ester monomers (excluding the above-mentioned ones), ethylene, α-olefin monomers, aromatic vinyl monomers, fluorine-containing vinyl monomers, copolymerizable antiaging agents, and the like.

Examples of the α,β-ethylenically unsaturated monocarboxylic acid ester monomers include (meth)acrylic acid esters having a $C_2$ to $C_{12}$ cyanoalkyl group such as α-cyanoethyl acrylate, α-cyanoethyl methacrylate, and cyanobutyl methacrylate; (meth)acrylic acid esters having a $C_1$ to $C_{12}$ hydroxyalkyl group such as 2-hydroxyethyl acrylate, 2-hydroxypropyl acrylate, and 2-hydroxyethyl methacrylate; (meth)acrylic acid esters having a $C_1$ to $C_{12}$ fluoroalkyl group such as trifluoroethyl acrylate and tetrafluoropropyl methacrylate; and the like.

The α-olefin monomers are preferably those having 3 to 12 carbon atoms. Examples thereof include propylene, 1-butene, 4-methyl-1-pentene, 1-hexene, 1-octene, and the like.

Examples of the aromatic vinyl monomers include styrene, α-methylstyrene, vinylpyridine, and the like.

Examples of the fluorine-containing vinyl monomers include fluoroethyl vinyl ether, fluoropropyl vinyl ether, o-trifluoromethyl styrene, vinyl pentafluorobenzoate, difluoroethylene, tetrafluoroethylene, and the like.

Examples of the copolymerizable antiaging agents include N-(4-anilinophenyl) acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, and the like.

These different copolymerizable monomers may be used alone or in combination. The content of units of the different monomer(s) in the nitrile rubber used in the present invention is preferably 30 wt % or less, more preferably 15 wt % or less, still more preferably 5 wt % or less.

The nitrile rubber used in the present invention has an iodine value of preferably 120 or less, more preferably 50 or less, still more preferably 20 or less, further still more preferably 10 or less. Control of the iodine value to the above ranges up to 120 results in a cross-linked rubber having further enhanced heat resistance and ozone resistance.

The nitrile rubber used in the present invention has a Mooney viscosity [ML1+4(100° C.)] of preferably 5 to 200, more preferably 10 to 100, still more preferably 15 to 80.

The nitrile rubber used in the present invention can be polymerized by any polymerization method, and examples of a convenient and preferred method include a method of copolymerizing the α,β-ethylenically unsaturated nitrile monomer, the conjugated diene monomer, and the carboxyl group-containing monomer and a different monomer copolymerizable with the above-mentioned monomers which are optionally added. As the polymerization method, any one of known emulsion polymerization and solution polymerization methods can be used. Preferred is emulsion polymerization because it is easy to control the polymerization reaction. By emulsion polymerization, the nitrile rubber can be obtained in the faun of a latex in which the nitrile rubber is dispersed in an aqueous medium, that is, a latex of nitrile rubber.

In emulsion polymerization, an emulsifier, a polymerization initiator, and a molecular weight modifier as well as polymerization additives usually used can be used.

Examples of the emulsifier include, but should not be limited to, nonionic emulsifiers such as polyoxyethylene alkyl ether, polyoxyethylene alkylphenol ether, polyoxyethylene alkyl ester, and polyoxyethylene sorbitan alkyl ester; anionic emulsifiers, such as salts of fatty acids such as myristic acid, palmitic acid, stearic acid, oleic acid, and linolenic acid, alkylbenzene sulfonates such as sodium dodecylbenzenesulfonate, polycondensates of naphthalene sulfonate and formalin, higher alcohol sulfuric acid ester salts, and alkyl sulfosuccinic acid salts; copolymerizable emulsifiers such as sulfoesters of α,β-unsaturated carboxylic acids, sulfate esters of α,β-unsaturated carboxylic acids, and sulfoalkyl aryl ether; and the like. The amount of the emulsifier to be added is preferably 0.1 to 10 parts by weight, more preferably 0.5 to 5 parts by weight relative to 100 parts by weight of the monomers used in polymerization.

The polymerization initiator can be any radical initiator, and examples thereof include inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, t-butylperoxy isobutyrate, and diisopropylbenzene hydroperoxide; azo compounds such as azobisisobutyronitrile, azobis-2,4-dimethylvaleronitrile, azobiscyclohexanecarbonitrile, and methyl azobisisobutyrate; and the like. These polymerization initiators can be used alone or in combination. The polymerization initiator is preferably an inorganic or organic peroxide. When a peroxide is used as the polymerization initiator, it can be used as a redox polymerization initiator in combination with a reducing agent such as sodium bisulfite or ferrous sulfate. The amount of the polymerization initiator to be added is preferably 0.01 to 2 parts by weight relative to 100 parts by weight of the monomers used in polymerization.

Examples of the molecular weight modifier include, but should not be limited to, mercaptans such as t-dodecylmercaptan, n-dodecylmercaptan, and octylmercaptan; halogenated hydrocarbons such as carbon tetrachloride, methylene chloride, and methylene bromide; α-methylstyrene dimers; sulfur-containing compounds such as tetraethylthiuram disulfide, dipentamethylenethiuram disulfide, and diisopropylxanthogen disulfide; and the like. These can be used alone or in combination. Among these, preferred are mercaptans, and more preferred is t-dodecylmercaptan. The amount of the molecular weight modifier to be added is preferably 0.1 to 5 parts by weight relative to 100 parts by weight of the monomers used in polymerization.

Usually, water is used as a medium for emulsion polymerization. The amount of water is preferably 80 to 500 parts by weight, more preferably 80 to 300 parts by weight relative to 100 parts by weight of the monomers used in polymerization.

In emulsion polymerization, furthermore, optional polymerization additives such as a stabilizer, a dispersant, a pH adjuster, a deoxidizer, and a particle size adjuster can be used. When these polymerization additives are used, their kinds and amounts are not particularly limited.

The resulting copolymer may be hydrogenated (subjected to a hydrogenating reaction) as needed. The hydrogenation may be performed by a known method. Examples thereof include an oil layer hydrogenation method of coagulating a latex of a copolymer prepared through emulsion polymerization, and thereafter hydrogenating the copolymer in an oil layer; an aqueous layer hydrogenation method of hydrogenating the prepared latex of a copolymer as it is; and the like. In the present invention, preferred is the aqueous layer hydrogenation method because the production process can be simplified. By the aqueous layer hydrogenation method, the nitrile rubber can be obtained in a form of a latex in which the nitrile rubber is dispersed in an aqueous medium, that is, a latex of nitrile rubber (a nitrile rubber aqueous dispersion containing nitrile rubber particles dispersed in water).

When the hydrogenation is performed by the aqueous layer hydrogenation method, suitably, the latex of the copolymer prepared by emulsion polymerization described above is optionally diluted by adding water, and is hydrogenated. Examples of the aqueous layer hydrogenation method include an aqueous layer direct hydrogenation method of performing hydrogenation while feeding hydrogen to a reaction system in the presence of a hydrogenation catalyst, and an aqueous indirect hydrogenation method of reducing and hydrogenating the copolymer in the presence of an oxidizing agent, a reducing agent, and an activating agent. Among these, preferred is the aqueous layer direct hydrogenation method.

The hydrogenation catalyst can be any compound which is hardly decomposed by water. Specific examples thereof include palladium catalysts such as palladium salts of carboxylic acids such as formic acid, propionic acid, lauric acid, succinic acid, oleic acid, and phthalic acid; chlorides of palladium such as palladium chloride, dichloro(cyclooctadiene)palladium, dichloro(norbonadiene)palladium, and ammonium hexachloropalladate(IV); iodides thereof such as palladium iodide; palladium nitrate; palladium sulfate dihydrate; and the like. Among these, particularly preferred are palladium salts of carboxylic acids, dichloro(norbonadiene) palladium and ammonium hexachloropalladate(IV), palladium chloride, and palladium nitrate. Besides the palladium catalysts containing palladium as a metal, a ruthenium catalyst, a rhodium catalyst, an osmium catalyst, an iridium catalyst, or a platinum catalyst can also be used as the hydrogenation catalyst. Although the amount of the metal (e.g., palladium) used in the hydrogenation catalyst may be appropriately determined, the amount is preferably 5 to 20000 ppm by weight, more preferably 10 to 15000 ppm by weight relative to the copolymer prepared by polymerization.

In the aqueous layer direct hydrogenation method, the hydrogenation catalyst in the latex may be removed after the hydrogenating reaction is completed. For example, a removal method can be used, in which the latex is subjected to a step of adsorbing the hydrogenation catalyst under stirring with an adsorbent, such as activated carbon or an ion exchange resin, added to the latex, or a step of forming a complex of the hydrogenation catalyst in the presence of an oxidizing agent or a reducing agent and a complexing agent, and then is centrifuged and/or filtrated. The hydrogenation catalyst can be left in the latex, rather than removed.

<Method for Producing Nitrile Rubber>

Next, a method for producing a nitrile rubber by recovering the nitrile rubber (solid nitrile rubber) from the latex of nitrile rubber prepared as above (nitrile rubber aqueous dispersion) will be described. Hereinafter, the present invention will be described by illustrating an extruder 1 shown in FIG. 1 as a production apparatus for recovering the nitrile rubber from the latex of nitrile rubber, but is not particularly limited to the method using the extruder 1 shown in FIG. 1.

As shown in FIG. 1, the extruder 1 includes a drive unit 2, and a single barrel 3 composed of eighteen divided barrel blocks 31 to 48. Inside the barrel 3, a coagulation zone 100, a drainage zone 102, a washing/dewatering zone 104, and a drying zone 106 are sequentially formed from upstream to downstream of the barrel 3.

The coagulation zone 100 is a region in which the latex of nitrile rubber and a coagulant are brought into contact with each other to coagulate a polymer, thus forming a slurry solution of crumb-like nitrile rubber (crumb slurry). The drainage zone 102 is a region in which a liquid (serum water) caused after the coagulation of the nitrile rubber is separated from the crumb slurry, and is discharged to obtain crumbs in a water-containing state. The washing/dewatering zone 104 is a region in which the crumbs in a water-containing state are washed, and the washing water is removed from the crumbs after washing, and is discharged. The drying zone 106 is a region in which the dewatered crumbs are dried.

In the extruder 1 shown in FIG. 1, the insides of the barrel blocks 31 to 36 define the coagulation zone 100, the inside of the barrel block 37 defines the drainage zone 102, the insides of the barrel blocks 38 to 41 define the washing/dewatering zone 104, and the insides of the barrel blocks 42 to 48 define the drying zone 106. The number of barrel blocks to be installed in each zone can be optimized according to the composition of the nitrile rubber to be handled, and the like, and is not limited to that shown in FIG. 1.

The barrel block 32 which constitutes part of the coagulation zone 100 is provided with a feed port 320 (not illustrated) for feeding the latex of nitrile rubber, a feed port 321 (not illustrated) for feeding a coagulant, and a feed port 322 (not illustrated) for feeding water vapor. The barrel block 37 which constitutes the drainage zone 102 is provided with drainage slits 370 through which the serum water separated from the water slurry of coagulated nitrile rubber is discharged. Furthermore, the barrel block 38 which constitutes part of the washing/dewatering zone 104 is provided with a washing water feed port 380 which receives the washing water, and the barrel block 39 is provided with drainage slits 390 through which the washing drainage is discharged to the outside. The barrel blocks 43, 46, and 47 which constitute part of the drying zone 106 are provided with vent ports 430, 460, and 470 for degassing, respectively.

Figure 2:
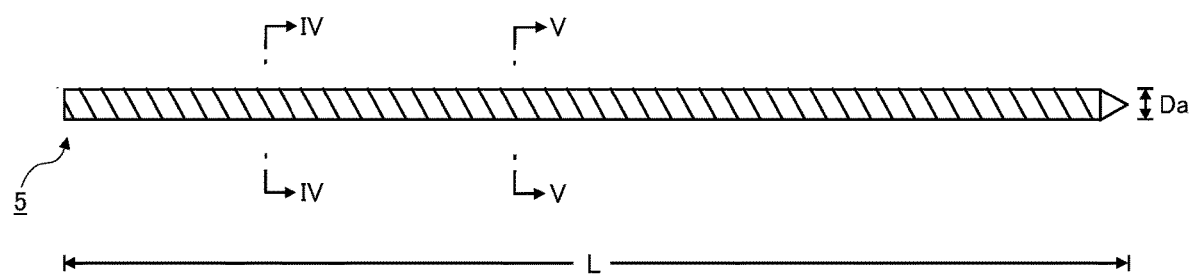
FIG. 2 is a schematic view showing a screw disposed inside the extruder.

FIG. 2 is a schematic view showing a screw disposed inside the extruder 1. A screw 5 shown in FIG. 2 is disposed inside the barrel 3. To drive the screw 5, the base end of the screw 5 is connected to a drive means such as a motor housed in the drive unit 2 (see FIG. 1), and the screw 5 is thereby held to be rotatably driven. The screw 5 can have any shape, and can be configured, for example, with an appropriate combination of screw blocks and kneading disks having various screw configurations.

Figure 3:
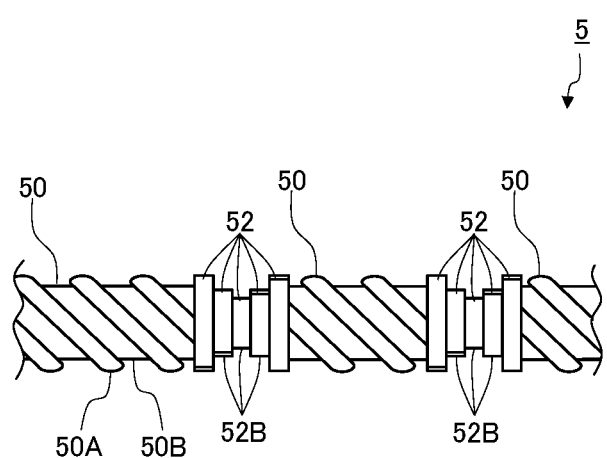
FIG. 3 is a partially cut-out schematic view of the screw shown in FIG. 2.

In the extruder 1, the screw 5 has different screw configurations in the regions defining the zones 100, 102, 104, and 106 inside the barrel 3. Here, FIG. 3 is a partially broken schematic view of the screw shown in FIG. 2. As shown in FIG. 3, the screw 5 is composed of a screw block 50 and kneading disks 52. FIG. 3 is a diagram illustrating one example of a combination of the screw block 50 and the kneading disks 52, and the combination shown in FIG. 3 should not be construed as limitations to the present invention.

As shown in FIG. 2 where the length of the screw 5 is defined as L (mm) and the outer diameter of the screw 5 is defined as Da (mm), L/Da is preferably 30 to 100, more preferably 40 to 80. The outer diameter Da of the screw 5 is defined as the diameter of a crest portion 50A (see FIG. 3) of the screw block 50 constituting the screw when viewed in the axial direction.

Figure 4:
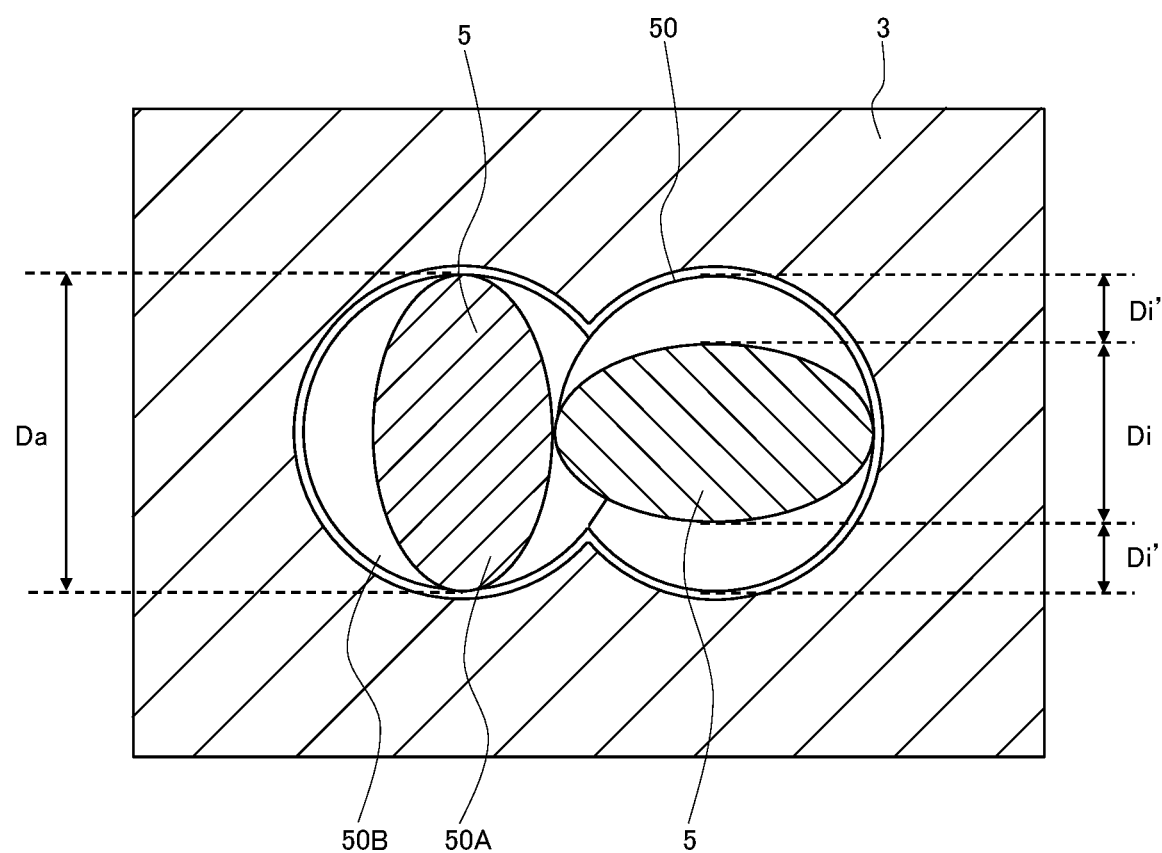
FIG. 4 is a cross-sectional view taken along line IV-IV in FIG. 1 and line IV-IV in FIG. 2.

As shown in FIG. 4, using two screws 5 having such a configuration, the extruder 1 is implemented as a twin-screw extruder in which the two screws are disposed in parallel and their shaft cores are meshed with each other. Here, FIG. 4 is a cross-sectional view taken along IV-IV line in FIG. 1 and IV-IV line in FIG. 2. The cross-sectional view shown in FIG. 4 is a cross-sectional view of a portion of the screw block 50 in the extruder 1, which view is taken across a root portion 50B. That is, as shown in FIG. 4, the two screws 5 and 5 are of a biaxial meshing type in which crest portions 50A of the screw block 50 for coagulation in one screw 5 are meshed with root portions 50B of the screw block 50 for coagulation in the other screw 5 while root portions 50B of the screw block 50 for coagulation in the one screw 5 are meshed with crest portions 50A of the screw block 50 for coagulation in the other screw 5. The biaxial meshing type can improve mixing properties in the zones 100, 102, 104, and 106. The rotational directions of the two screws 5 may be the same or different. From the viewpoint of self-cleaning performance, preferred is a type such that the screws rotate in the same direction.

As shown in FIG. 4 where the outer diameter of the screw block 50 is defined as Da (mm) and the shorter diameter of a root portion 50B of the screw block 50 is defined as Di (mm), Da/Di is in the range of preferably 1.2 to 2.5, more preferably 1.4 to 2.0, still more preferably 1.5 to 1.8. By controlling Da/Di within these ranges, the recovery rate and the production rate (amount of dried nitrile rubber obtained per unit time) can be improved without making the facilities large-scale.

As shown in FIG. 4, the shorter diameter Di of the root portion 50B is the diameter of a portion of the root portion 50B in which the root portion 50B has the deepest depth Di' (mm) viewed in the axial direction. That is, the shorter diameter Di of the root portion 50B can be determined from the outer diameter Da and the depth Di' in the deepest portion of the root portion 50B using Di=Da−(Di'×2).

Figure 5:
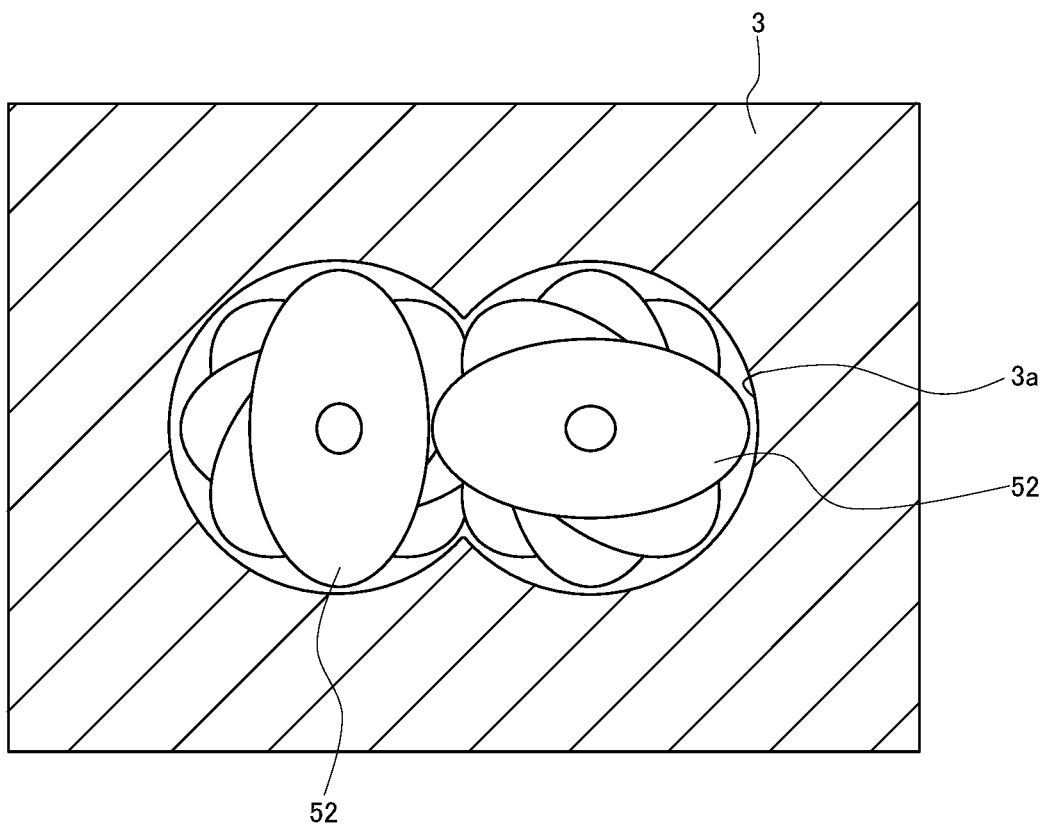
FIG. 5 is a cross-sectional view taken along line V-V in FIG. 1 and line V-V in FIG. 2.

The kneading disks 52 have a cross-sectional shape such as a pseudo-elliptical shape, an oval shape, or a truncated triangle shape, and have a predetermined thickness. The kneading disks 52, when used, are stacked with their axes of symmetry of the cross-sectional shape shifted by a predetermined angle, and are fixed such that the screw axis corresponds to the rotation center axis of the cross-sectional shape. Here, FIG. 5 is a cross-sectional view taken along V-V line in FIG. 1 and V-V line in FIG. 2. The cross-sectional view shown in FIG. 5 is a cross-sectional view of a portion of kneading disks 52 in the extruder 1. FIGS. 3 and 5 show a form of the kneading disks 52 in which five disks have a pseudo-elliptical cross-sectional shape, and are stacked while being shifted by 45°. To be noted, the kneading disks 52 can have any other form without limitation. Plural kneading disks 52 can be combined at a predetermined shift angle to form forward feed kneading disks, neutral kneading disks, or backward feed kneading disks. The forward feed kneading disks refer to a plurality of kneading disks 52 that are shifted in phase in the forward feed direction (e.g., shifted by 45° or 60°) to have a feeding capability in the forward feed direction. The backward feed kneading disks refer to a plurality of kneading disks 52 that are shifted in phase in the backward feed direction (e.g., shifted by 270°) to have a feeding capability in the backward feed direction. The neutral kneading disks refer to a plurality of kneading disks 52 that are shifted by 90° and formed in parallel in the axial direction so as not to have a feeding capacity.

In FIGS. 3 and 5, the kneading disks 52 have a pseudo-elliptical cross-sectional shape. The pseudo-elliptical shape refers to a shape obtained by cutting both end potions of the longer diameter of an ellipse at arcs centered on the rotation center of the figure. The oval shape refers to a shape obtained by cutting both end potions of the parallel strips at arcs centered on the rotation center of the figure. The truncated triangle shape refers to a shape obtained by cutting potions including respective vertices of a regular triangle at arcs centered on the rotation center of the figure. In any shape, the end portions of each disk are provided to maintain a clearance (gap) of about 0.1 to 5 mm to the inner wall surface 3a of the barrel 3. In the case of an oval shape or a truncated triangle, each side may be in a concave shape such as a drum shape or a triangular spool shape.

Downstream of the barrel block 48 described above, a die 4 is connected to produce an extruded product by extruding the nitrile rubber into a predetermined shape after coagulation, dewatering, and drying inside the barrel 3. For example, the nitrile rubber can be extruded into a sheet shape. The die 4 is usually provided with a metal mesh upstream of its discharge port to trap foreign substances and the like.

Next, the method of recovering the nitrile rubber from the latex of nitrile rubber using such an extruder 1 will be described.

First, the latex of nitrile rubber, a coagulant, and water vapor are fed to the coagulation zone 100 from a pipe connected to the feed port 320, a pipe connected to the feed port 321, and a pipe connected to the feed port 322, respectively. Any coagulant can be used without limitation. To ensure sufficient processability and the like of the resulting nitrile rubber, a salt of a mono- or divalent metal is suitably used. Specific examples of the coagulant include calcium chloride, magnesium chloride, sodium chloride, magnesium sulfate, barium chloride, and the like. Sodium chloride is particularly suitably used.

In the present invention, in charging of the latex of nitrile rubber into the extruder 1, a hindered phenol-based antiaging agent having a molecular weight of 300 to 3000 is preliminarily added to the latex of nitrile rubber before charging to the extruder 1. Thereby, the latex of nitrile rubber containing the hindered phenol-based antiaging agent is prepared, and is charged into the extruder 1.

Specifically, a hindered phenol-based antiaging agent having a molecular weight of 300 to 3000 is added to the latex of nitrile rubber before charging into the extruder 1 in a proportion of 0.1 to 3 parts by weight relative to 100 parts by weight of the nitrile rubber contained in the latex of nitrile rubber, and the latex of nitrile rubber containing the hindered phenol-based antiaging agent is charged into the extruder 1. According to the present invention, a specific amount of the hindered phenol-based antiaging agent having a molecular weight of 300 to 3000 is preliminarily added to the latex of nitrile rubber before charging into the extruder 1, and the latex of nitrile rubber containing the hindered phenol-based antiaging agent is charged into the extruder 1 with the coagulant. As a result, when the nitrile rubber is recovered from the latex of nitrile rubber, occurrence of fouling in the extruder 1 and fouling in the metal mold used during forming can be effectively suppressed due to the specific amount of the hindered phenol-based antiaging agent. Furthermore, the resulting nitrile rubber can have high processability (particularly, processability when compounded with a cross-linking agent and the like to prepare a rubber composition).

The hindered phenol-based antiaging agent may be a compound having a molecular weight of 300 to 3000 and having a phenol structure having a bulky group (such as a t-butyl group or an octylthiomethyl group) in the two ortho positions with respect to the OH group (phenolic hydroxyl group) of the phenol structure, or may be a compound having a molecular weight of 300 to 3000 and having a bulky group (such as a t-butyl group or an octylthiomethyl group) in one of the two ortho positions with respect to the OH group (phenolic hydroxyl group) of the phenol structure and a methyl group in the other ortho position. Examples of the hindered phenol-based antiaging agent include, but should not be limited to, 4,6-bis(octylthiomethyl)-o-cresol, 2,2'-methylenebis(4-methyl-6-t-butylphenol), 2,2'-methylenebis(4-ethyl-6-t-butylphenol), n-octadecyl-3-(3',5'-di-t-butyl-4'-hydroxyphenyl)propionate, 1,3,5-tris(3,5-di-t-butyl-4-hydroxybenzyl)-s-triazin-2,4,6-(1H,3H,5H)trione, pentaerythritol-tetrakis(3-(3,5-di-t-butyl-4-hydroxyphenyl)propionate), N,N-hexamethylenebis(3,5-di-tert-butyl-4-hydroxy-hydrocinnamide), tris(3,5-di-t-butyl-4-hydroxybenzyl)-isocyanurate, and the like. The hindered phenol-based antiaging agent has a molecular weight in the range of 300 to 3000, preferably 400 to 2000, more preferably 400 to 1200, still more preferably 400 to 1000, further still more preferably 400 to 600. A hindered phenol-based antiaging agent having a molecular weight within the predetermined ranges above can effectively suppress occurrence of fouling in the extruder, and enables production of a nitrile rubber having high processability.

When the hindered phenol-based antiaging agent having a molecular weight of 300 to 3000 is added to the latex of nitrile rubber before charging into the extruder 1, the amount thereof to be added is 0.1 to 3 parts by weight, preferably 0.3 to 2.5 parts by weight, more preferably 0.5 to 2.0 parts by weight, still more preferably 0.7 to 2.0 parts by weight, further still more preferably 0.7 to 1.6 parts by weight relative to 100 parts by weight of the nitrile rubber contained in the latex of nitrile rubber. Use of a significantly small amount of the hindered phenol-based antiaging agent having a molecular weight of 300 to 3000 results in a nitrile rubber having poor processability. Use of a significantly large amount of the hindered phenol-based antiaging agent having a molecular weight of 300 to 3000 results in occurrence of fouling in the metal mold used during forming of the resulting nitrile rubber (or during forming and cross-linking at the same time), reducing the productivity.

If an antiaging agent other than the hindered phenol-based antiaging agent having a molecular weight of 300 to 3000 is used, fouling occurs in the extruder 1. More specifically, fouling occurs in the vent ports 430, 460, and 470 of the extruder 1, reducing the productivity. In particular, if fouling occurs in the vent ports 430, 460, and 470 of the extruder 1, the fouling may fall to the inside of the extruder 1 to contaminate the nitrile rubber. For this reason, to prevent such contamination of the nitrile rubber, the fouling occurring in the vent ports 430, 460, and 470 of the extruder 1 needs to be removed highly often, thus reducing the productivity.

The hindered phenol-based antiaging agent having a molecular weight of 300 to 3000 can be preliminarily added to the latex of nitrile rubber before charging into the extruder 1 by any method, and the hindered phenol-based antiaging agent as it is may be added to the latex of nitrile rubber. To appropriately suppress occurrence of the fouling in the metal mold used during forming, it is preferred that the hindered phenol-based antiaging agent be emulsified in water, and the resulting emulsion be added.

When the hindered phenol-based antiaging agent having a molecular weight of 300 to 3000 in the form of an emulsion is added to the latex of nitrile rubber before charging into the extruder 1, the emulsion is preferably prepared using an emulsifier. The emulsifier can be any emulsifier without limitation, and may be appropriately selected according to the type of the hindered phenol-based antiaging agent to be used. For example, the above-mentioned emulsifiers used in emulsion polymerization of the nitrile rubber can be used.

When the hindered phenol-based antiaging agent having a molecular weight of 300 to 3000 in the form of an emulsion is added to the latex of nitrile rubber before charging into the extruder 1, the content of the hindered phenol-based antiaging agent in the emulsion is not particularly limited. To further enhance the effect of adding the hindered phenol-based antiaging agent in the foul of an emulsion, the content thereof is preferably 1 to 70 wt %, more preferably 5 to 60 wt %, still more preferably 10 to 50 wt %, further still more preferably 15 to 25 wt %.

The amount of the coagulant to be fed from the feed port 321 is preferably 0.5 to 200 parts by weight, more preferably 1 to 95 parts by weight, still more preferably 45 to 75 parts by weight relative to 100 parts by weight of the nitrile rubber contained in the latex of nitrile rubber. By controlling the amount of the coagulant to be fed within the ranges above, coagulation of the nitrile rubber can be sufficiently promoted to reduce uncoagulated contents, thus improving the yield. The coagulant may be dissolved in water or the like, and may be fed from the feed port 321 in the form of a coagulant solution. In this case, the concentration of the coagulant in the coagulant solution is not particularly limited, and is preferably about 1 to 35 wt %, more preferably 15 to 25 wt % relative to the entire coagulant solution.

The latex of nitrile rubber, the coagulant, and the water vapor fed to the coagulation zone 100 are brought into contact with each other by rotation of the screw 5. The nitrile rubber is coagulated, and is suspended in water in the form of crumbs having a diameter of about 5 to 30 mm to give a slurry solution (crumb slurry) having a crumb concentration of about 5 to 30 wt %. The inner temperature of the coagulation zone 100 is controlled to the range of preferably 10 to 100° C., more preferably 45 to 90° C. By controlling the temperature of the coagulation zone 100 within these ranges, the coagulation of the nitrile rubber can be sufficiently progressed while the nitrile rubber is favorably coagulated. This can reduce uncoagulated contents, thus improving the yield.

The crumb slurry obtained in the coagulation zone 100 is sent to the drainage zone 102 by the rotation of the screw 5. In the drainage zone 102, a high concentration of the coagulant contained in the crumb slurry is discharged as serum water from the slits 370 disposed in the barrel block 37. Thus, crumbs in a water-containing state which contains about 40 to 70 wt % of water are obtained.

The crumbs in a water-containing state obtained in the drainage zone 102 are sent to the washing/dewatering zone 104 by the rotation of the screw 5. In the washing/dewatering zone 104, washing water is introduced from the washing water feed port 380 disposed in the barrel block 38 into the inside thereof. The crumbs are washed by mixing the washing water and the crumbs, and are then dewatered. The drainage water is discharged from the slits 390 disposed in the barrel block 39.

The screw configuration of a portion of the screw 5 corresponding to the washing water feed port 380 disposed in the barrel block 38 which constitutes the washing/dewatering zone 104 (namely, the screw configuration of the screw 5 in the outlet of the washing water feed port 380) is composed of a plurality of kneading disks 52. When the screw configuration of the portion of the screw 5 corresponding to the washing water feed port 380 is composed of a plurality of kneading disks 52, the water pressure of the washing water to be fed from the washing water feed port 380 can be increased, thereby enhancing the washing efficiency. Thus, the sodium content and the total content of calcium, magnesium, and aluminum in the nitrile rubber to be recovered, which are attributed to the coagulant and the like, can be appropriately reduced, providing a nitrile rubber having enhanced water resistance.

In particular, when the potion of the screw 5 corresponding to the washing water feed pots 380 is composed of a plurality of kneading disks 52, the presence of the plurality of kneading disks 52 and the presence of the crumbs kneaded by the plurality of kneading disks 52 decrease the volume of space in the potion so that diffusion of the washing water fed from the washing water feed port 380 inside the barrel block 38 is suppressed (or a flow path is less likely to be ensured). Thus, the water pressure of the washing water to be fed can be increased. When the portion of the screw corresponding to the washing water feed port 380 is composed of a plurality of kneading disks 52, the disk configuration is not particularly limited. The disk configuration is preferably composed of forward feed kneading disks, neutral kneading disks, or backward feed kneading disks, or may be composed of a combination thereof.

In the present invention, it is sufficient that the portion of the screw 5 corresponding to the washing water feed port 380 is composed of a plurality of kneading disks 52. To more appropriately increase the water pressure of the washing water to be fed, the screw 5 is preferably configured such that the proportion of the kneading disks 52 (proportion in the length direction) is preferably 30 to 100%, more preferably 60 to 100% in the barrel block 38 provided with the washing water feed port 380. Such a configuration can further increase the crumb washing efficiency in the washing/dewatering zone 104.

Although the proportion of the kneading disks 52 occupying the screw 5 in the entire washing/dewatering zone 104 (proportion in the length direction) is not particularly limited, to enhance the dewatering efficiency in addition to the washing efficiency, the proportion is preferably 5 to 85%, more preferably 10 to 80%.

Although the feed rate of the washing water fed from the washing water feed port 380 is not particularly limited, the feed rate is preferably 30 to 600 L/hr, more preferably 70 to 500 L/hr. The amount of the washing water fed from the washing water feed port 380 is preferably 25 to 1000 parts by weight, more preferably 50 to 900 parts by weight relative to 100 parts by weight of the nitrile rubber. By controlling the feed rate and washing water of the washing water to these ranges above, the washing effect in the washing/dewatering zone 104 can be further enhanced, and thus, the sodium content and the total content of calcium, magnesium, and aluminum in the nitrile rubber to be recovered, which are attributed to the coagulant and the like, can be more effectively reduced. Although the temperature of the washing water is not particularly limited, the temperature thereof is preferably 10 to 90° C., more preferably 40 to 80° C.

In a region upstream of the washing water feed port 380 in the washing/dewatering zone 104, the barrel block temperature is controlled to preferably 40 to 100° C., more preferably 50 to 95° C. In a region downstream of the washing water feed port 380, the barrel block temperature is controlled to preferably 80 to 200° C., more preferably 90 to 180° C. In the washing/dewatering zone 104, washed crumbs containing about 2 to 20 wt % of water are obtained.

Subsequently, the crumbs obtained in the washing/dewatering zone 104 are sent to the drying zone 106 by the rotation of the screw 5. The crumbs sent to the drying zone 106 are plasticized and kneaded by the rotation of the screw 5 to become a melt, which is carried downstream while generating heat and raising the temperature. When the melt reaches the vent ports 430, 460, and 470 disposed in the barrel blocks 43, 46, and 47, the water contained in the melt is separated and vaporized due to release of the pressure. The separated and vaporized water (vapor) is discharged through a vent pipe (not illustrated) to the outside. The inner temperature of the drying zone 106 is controlled to preferably 90 to 200° C., more preferably 100 to 180° C. The inner pressure (pressure in the die) is about 1000 to 13000 kPa (G: gauge pressure). The drying zone 106 may be depressurized.

The crumbs separated from water by passing through the drying zone 106 are sent to the outlet side by the screw 5, and are introduced to the die 4 in a state of substantially containing almost no water (the water content is 1.0 wt % or less). The crumbs are discharged from the die in the form of a sheet, for example, and the resulting sheet is introduced into a sheet cutter (not illustrated), and is cut into an appropriate length.

Thus, the nitrile rubber can be recovered from the latex of nitrile rubber.

In the present invention, it is preferable to select conditions which provide a Q/N [kg/(hr·rpm) of 0.22 kg/(hr·rpm) or less, more preferably 0.21 kg/(hr·rpm) or less, still more preferably 0.16 to 0.20 kg/(hr·rpm) where the amount per unit time of the nitrile rubber to be fed to the feed port 320 of the extruder 1 (process amount per unit time of the nitrile rubber to be recovered in the extruder 1) is defined as Q [kg/hr] and the number of rotations of the screw 5 is defined as N [rpm]. The number N of rotations of the screw 6 indicates the number of rotations [rpm] when the screw 5 in the extruder 1 rotates inside the barrel 3 for 1 minute. Control of the Q/N to the ranges above can effectively reduce volatile contents, such as water, contained in the nitrile rubber to be recovered even with a relatively high production rate (process amount). This can effectively suppress deficits caused by residual volatile matter such as water, e.g., inhibition of cross-linking or the like, resulting in a cross-linked rubber having high mechanical strength. The amount of volatile matter, such as water, contained in the nitrile rubber to be recovered is preferably 0.7 wt % or less, more preferably 0.5 wt % or less.

In the nitrile rubber recovered as above, the maximum value of chemiluminescent intensity measured according to JIS K7351:2018 is preferably 2,000 to 25,000 counts/sec, more preferably 3,000 to 20,000 counts/sec, still more preferably 5,000 to 20,000 counts/sec, particularly preferably 6,000 to 15,000 counts/sec. Control of the maximum value of the chemiluminescent intensity to the above ranges can more appropriately enhance the processability of the nitrile rubber to be recovered (particularly, the processability when compounded with a cross-linking agent and the like to prepare a rubber composition). The maximum value of the chemiluminescent intensity can be measured as follows: For example, the nitrile rubber is cut into a 1-cm square sample having a thickness of 2 mm with a razor, and the resulting sample is used in measurement. Using a chemiluminescence analyzer, the sample is measured at a measurement temperature of 170° C. and an $N_2$ gas flow rate of 150 ml/min for a measurement time of 600 seconds according to JIS K 7351:2018 (Sensitive measurement method of peroxide in plastics by detecting ultra-weak photon emission). Examples of a method of controlling the maximum value of the chemiluminescent intensity to the above ranges include a method of selecting the type and amount of the hindered phenol-based antiaging agent having a molecular weight of 300 to 3000 preliminarily added to the latex of nitrile rubber before charging into the extruder 1, a method of selecting the configuration of the screw 5, the number of rotations of the screw 5, and the temperature of the drying zone 106 in the extruder 1, and the like.

<Rubber Composition>

The nitrile rubber produced as described above can be used as a rubber composition by compounding a cross-linking agent, for example. Examples of the cross-linking agent include, but should not be limited to, sulfur cross-linking agents, organic peroxide cross-linking agents, polyamine cross-linking agents, and the like. Among these, preferred are polyamine cross-linking agents when the nitrile rubber produced as described above is a carboxyl group-containing nitrile rubber.

The polyamine cross-linking agent is not particularly limited as long as it is a compound having two or more amino groups or turns into a compound having two or more amino groups when cross-linked. Preferred are compounds of aliphatic hydrocarbons or aromatic hydrocarbons in which a plurality of hydrogen atoms is substituted by an amino group or a hydrazide structure (structure represented by $-CONHNH_2$ where CO represents a carbonyl group) and those which turn into such compounds when cross-linked.

Specific examples of the polyamine cross-linking agents include aliphatic polyvalent amines such as hexamethylenediamine, hexamethylenediamine carbamate, N,N-dicinnamylidene-1,6-hexanediamine, tetramethylene pentaamine, and hexamethylenediamine cinnamaldehyde adducts; aromatic polyvalent amines such as 4,4-methylenedianiline, m-phenylenediamine, 4,4-diaminodiphenyl ether, 3,4-diaminodiphenyl ether, 4,4-(m-phenylenediisopropylidene)dianiline, 4,4-(p-phenylenediisopropylidene)dianiline, 2,2-bis[4-(4-aminophenoxy)phenyl]propane, 4,4-diaminobenzanilide, 4,4-bis(4-aminophenoxy)biphenyl, m-xylylenediamine, p-xylylenediamine, and 1,3,5-benzenetriamine; and polyvalent hydrazides such as dihydrazide isophthalate, dihydrazide terephthalate, dihydrazide phthalate, dihydrazide 2,6-naphthalenedicarboxylate, dihydrazide naphthalate, dihydrazide oxalate, dihydrazide malonate, dihydrazide succinate, dihydrazide glutamate, dihydrazide adipate, dihydrazide pimelate, dihydrazide suberate, dihydrazide azelate, dihydrazide sebacate, dihydrazide brassylate, dihydrazide dodecanedioate, dihydrazide acetonedicarboxylate, dihydrazide fumarate, dihydrazide maleate, dihydrazide itaconate, dihydrazide trimellitate, dihydrazide 1,3,5-benzenetricarboxylate, dihydrazide aconitate, and dihydrazide pyromellitate. Among these, preferred are aliphatic polyvalent amines and aromatic polyvalent amines, more preferred are hexamethylenediamine carbamate and 2,2-bis[4-(4-aminophenoxy)phenyl]propane, and particularly preferred is hexamethylenediamine carbamate because these can provide more remarkable effects of the present invention.

The content of the cross-linking agent in the rubber composition according to the present invention, although not particularly limited, is preferably 0.1 to 20 parts by weight, more preferably 0.2 to 15 parts by weight, still more preferably 0.5 to 10 parts by weight relative to 100 parts by weight of the nitrile rubber.

Moreover, other than the cross-linking agent, the rubber composition according to the present invention can be compounded with compounding agents usually used in the rubber field. Examples thereof include fillers, metal oxides such as zinc oxide and magnesium oxide, α,β-ethylenically unsaturated carboxylic acid metal salts such as zinc methacrylate and zinc acrylate, cross-linking accelerators, co-cross-linking agents, cross-linking aids, cross-linking retarders, antiaging agents, antioxidants, light stabilizers, scorch inhibitors such as primary amine, activators such as diethylene glycol, silane coupling agents, plasticizers, processing aids, glidants, pressure-sensitive adhesives, lubricants, flame retardants, antifungal agents, acid receiving agents, antistatic agents, pigments, foaming agents, and the like. The compounding amounts of these compounding agents are not particularly limited as long a the object and effects of the present invention are not inhibited, and the compounding agents can be compounded in amounts according to the purpose of compounding.

Furthermore, the rubber composition according to the present invention may contain a rubber other than the nitrile rubber.

<Cross-Linked Rubber>

The above-mentioned rubber composition can be formed into a cross-linked rubber by cross-linking.

The cross-linked rubber according to the present invention can be produced by forming the rubber composition according to the present invention into a desired shape with a forming machine corresponding to such a desired shape, such as an extruder, an injection molding machine, a compressor, or a roll, causing a cross-linking reaction by heating, and solidifying the shape as the cross-linked product. In this case, the rubber composition may be preliminarily formed and then cross-linked, or may be formed and cross-linked at the same time. The forming temperature is usually 10 to 200° C., preferably 25 to 120° C. The cross-linking temperature is usually 100 to 200° C., preferably 130 to 190° C., and the cross-linking time is usually 1 minute to 24 hours, preferably 2 minutes to 1 hour.

Depending on the shape, the size, and the like thereof, the cross-linked rubber may be insufficiently cross-linked in its inside although its surface is cross-linked. For this reason, the cross-linked rubber may be further heated for secondary cross-linking. The heating method may be appropriately selected from standard methods used to cross-link rubber, such as press heating, steam heating, oven heating, and hot air heating.

The cross-linked rubber according to the present invention is prepared using the rubber composition containing the nitrile rubber according to the present invention. The cross-linked rubber according to the present invention can be used in broad applications: for example, a variety of sealing materials such as O-rings, packings, diaphragms, oil seals, shaft seals, bearing seals, wellhead seals, shock absorber seals, coolant seals as seals for sealing cool solutions, such as long life coolants (LLCs), oil coolant seals, seals for sealing Freon, fluorohydrocarbons, or carbon dioxide used in cooling apparatuses for air conditioners and compressors for refrigerators of air-conditioning systems, seals for sealing supercritical carbon dioxide or subcritical carbon dioxide used as washing media for precision cleaning, seals for roller devices (such as roller bearings, automotive hub units, automotive water pumps, linear guide devices, and ball screws), valves and valve sheets, blow out preventers (BOPs), and bladders; a variety of gaskets such as an intake manifold gasket attached to a connection between an intake manifold and a cylinder head, a cylinder head gasket attached to a connection between a cylinder block and a cylinder head, a rocker cover gasket attached to a connection between a rocker cover and a cylinder head, an oil pan gasket attached to a connection between an oil pan and a cylinder block or a transmission case, a gasket for fuel cell separators attached between a pair of housings which sandwich a unit cell including a positive electrode, an electrolyte plate, and a negative electrode, and a gasket for top covers for hard disk drives; a variety of rolls such as printing rolls, ironmaking rolls, papermaking rolls, industrial rolls, and office equipment rolls; a variety of belts such as flat belts (such as film core flat belts, cord flat belts, laminated flat belts, and single flat belts), V-belts (such as wrapped V-belts and low edge V-belts), V-ribbed belts (such as single V-ribbed belts, double V-ribbed belts, wrapped V-ribbed belt, rubber-backed V-ribbed belts, and top cog V-ribbed belts), CVT belts, timing belts, toothed belts, and conveyor belts; a variety of hoses such as fuel hoses, turbo air hoses, oil hoses, radiator hoses, heater hoses, water hoses, vacuum brake hoses, control hoses, air conditioner hoses, brake hoses, power steering hoses, air hoses, marine hoses, risers, and flow lines; a variety of boots such as CVJ boots, propeller shaft boots, constant-velocity joint boots, and rack and pinion boots; attenuating member rubber parts such as cushion materials, dynamic dampers, rubber couplings, air springs, vibration insulators, and clutch facing materials; dust covers, automotive interior members, friction materials, tires, covered cables, shoe soles, electromagnetic wave shields, adhesives such as adhesives for flexible printed circuit boards, fuel cell separators, as well as in the field of electronics.

EXAMPLES

The present invention will now be described more specifically by way of Examples and Comparative Examples. In each example, the term "paths" is weight-based unless otherwise specified.

The physical properties were evaluated by the following methods.

[Content of Each of Monomer Units Constituting Hydrogenated Nitrile Rubber]

The content of mono-n-butyl maleate units was calculated as follows. To 0.2 g of a 2-mm square piece of a hydrogenated nitrile rubber, 100 mL of 2-butanone was added. The mixture was stirred for 16 hours, and then 20 mL of ethanol and 10 mL of water were added to the mixture. With stirring, a titration was performed at room temperature using a 0.02 N hydrous ethanol solution of potassium hydroxide and thymolphthalein as an indicator to determine the number of moles of the carboxyl group relative to 100 g of hydrogenated nitrile rubber. Then, the determined number of moles was converged into the content of mono-n-butyl maleate units.

The contents of 1,3-butadiene units and saturated butadiene units were calculated by measuring the iodine values (according to K6235:2006) before and after hydrogenation using the hydrogenated nitrile rubber.

The content of acrylonitrile units was calculated by measuring the nitrogen content in the hydrogenated nitrile rubber by the Kjeldahl method according to the JIS K6451-2:2016.

The content of n-butyl acrylate units was calculated as the balance of the remaining component for the above monomer units.

[Mooney Viscosities of Hydrogenated Nitrile Rubbers]

The Mooney viscosities (polymer Mooney, ML1+4, 100° C.) of the hydrogenated nitrile rubbers were measured at 100° C. according to JIS K6300-1:2013.

[Mooney Viscosities of Rubber Compositions]

The Mooney viscosities (compound Mooney, ML1+4, 100° C.) of the rubber compositions were measured at 100° C. according to JIS K6300-1:2013.

[Maximum Value of Chemiluminescent Intensity in Hydrogenated Nitrile Rubbers]

The recovered hydrogenated nitrile rubbers were cut into 1-cm square samples having a thickness of 2 mm with a razor, and the resulting samples were used in measurement. Using a chemiluminescence analyzer (available from Tohoku Electronic Industrial CO., Ltd., trade name "CLA-FS4"), the chemiluminescent intensity in each sample was measured at a measurement temperature of 170° C. and an $N_2$ gas flow rate of 150 ml/min for a measurement time of 600 seconds according to JIS K 7351:2018 (Sensitive measurement method of peroxide in plastics by detecting ultra-weak photon emission). From the results of measurement, the maximum value of the chemiluminescent intensity within the measurement time was determined.

[Volatile Matter Content in Hydrogenated Nitrile Rubbers]

The volatile matter content in the hydrogenated nitrile rubbers was calculated as follows. According to JIS K 6238-1:2009 (oven A method), each hydrogenated nitrile rubber was dried at 105° C.±5° C. for 1 hour, and was spontaneously cooled in a desiccator. The volatile matter content (wt %) was calculated from the difference between the weights before and after drying using [((rubber weight before drying)−(rubber weight after drying))/(rubber weight before drying)]×100.

[Extruder Fouling]

After a latex (L1) of hydrogenated nitrile rubber was continuously subjected to coagulation, washing, dewatering, and drying for 6 hours using the extruder 1, fouling (state of pollution of the vent ports by the adhering rubber, the compounding agents, and the like) of the vent ports 430 of the extruder 1 was visually determined, and was evaluated according to the following criteria:
  A: No fouling is observed.
  B: Fouling is slightly observed.
  C: Fouling is clearly observed.
  F: Fouling is remarkably observed.

[Metal Mold Fouling Properties]

Metal mold fouling properties were evaluated by the following method. Specifically, first, test pieces having a length of about 150 mm, a width of about 80 mm, and a thickness of about 2 mm were prepared from uncross-linked rubber compositions. Thereafter, each of the test pieces was sandwiched between metal molds for a sheet measuring 150 mm×80 mm×2 mm. Subsequently, an operation to perform press cross-linking at 180° C. and a pressure of 100 kg/cm³ for 10 minutes was performed 5 times. The fouling (state of metal mold pollution by the adhering rubber, the compounding agents, and the like) of the metal mold surface during the press cross-linking was visually determined, and was evaluated according to the following criteria:
  A: No fouling is observed.
  B: Fouling is slightly observed.
  C: Fouling is clearly observed.
  F: Fouling is remarkably observed.

Production Example 1, Production of Latex (L1) of Hydrogenated Nitrile Rubber

In a metallic bottle, 180 parts of deionized water, 25 parts of an aqueous solution of 10 wt % sodium dodecylbenzenesulfonate, 5 parts of a sodium salt of a condensate product of naphthalenesulfonic acid and formalin having a concentration of 10%, 20.4 parts of acrylonitrile, 5 parts of mono-n-butyl maleate, 35.2 parts of n-butyl acrylate, and 0.75 parts of t-dodecylmercaptan (molecular weight modifier) were sequentially added. The gas inside the metallic bottle was replaced with nitrogen three times, and 39.4 parts of 1,3-butadiene was charged into the metallic bottle. The metallic bottle was held at 10° C., and 0.1 parts of cumene hydroperoxide (polymerization initiator) and appropriate amounts of a reducing agent, a chelating agent, and a builder were charged. The polymerization reaction was continued with stirring. When the polymerization conversion ratio reached 80%, 4 parts of an aqueous solution of 2.5 wt % 2,2,6,6-tetramethylpiperidin-1-oxyl (polymerization terminator) was added to terminate the polymerization reaction. Subsequently, residual monomers were removed at a water temperature of 60° C. to prepare a latex (X1) of nitrile rubber (solids content: 28 wt %).

Separately from the above, an amount of an aqueous solution containing sodium chloride twice the molar equivalent of Pd metal in palladium chloride was added to palladium chloride (2800 ppm by weight as the weight ratio of Pd metal in palladium chloride/nitrile rubber in latex) to prepare a palladium aqueous solution. Then, polyvinylpyrrolidone having a weight average molecular weight of 5,000 was added to 300 parts of the palladium aqueous solution in an amount 5 times that of the Pd metal in palladium chloride in terms of the weight ratio, and a potassium hydroxide aqueous solution was further added to prepare a catalyst aqueous solution having a pH of 12.0.

In the next step, in an autoclave, the catalyst aqueous solution prepared above was added to the latex (X1) of nitrile rubber prepared above such that the palladium content was 2800 ppm by weight relative to the dry weight of the rubber contained in the latex (X1) of nitrile rubber prepared above, and hydrogenation was performed at a hydrogen pressure of 3 MPa and a temperature of 50° C. for 6 hours to prepare a latex (L1) of hydrogenated nitrile rubber (solids content: 13.5 wt %). The composition of the hydrogenated nitrile rubber contained in the resulting latex (L1) of hydrogenated nitrile rubber consisted of 20.5 wt % of acrylonitrile units, 45.5 wt % of 1,3-butadiene units (including saturated moieties), 5.0 wt % of mono-n-butyl maleate units, and 29 wt % of n-butyl acrylate units, and had an iodine value of 7.

Example 1

An emulsion of 4,6-bis(octylthiomethyl)-o-cresol (available from BASF Japan Ltd., trade name "Irganox 1520L", molecular weight: 424.8) as a hindered phenol-based antiaging agent was added to the latex (L1) of hydrogenated nitrile rubber prepared in Production Example 1, the emulsion being prepared by dispersing 0.8 parts of 4,6-bis (octylthiomethyl)-o-cresol relative to 100 parts by weight of solids in the latex in 1.5 parts of an aqueous solution of 20 wt % sodium alkylbenzenesulfonate. Thus, the latex containing the hindered phenol-based antiaging agent (solids content: 13.5 wt %) was prepared.

Subsequently, the pH of the resulting latex containing the hindered phenol-based antiaging agent was adjusted to 3.6 (solids content: 13.5 wt %) with a sulfuric acid aqueous solution. Thereafter, using a sodium chloride aqueous solution (concentration: 25 wt %) as a coagulant solution and water vapor, the latex (L1) of hydrogenated nitrile rubber was coagulated, washed, dewatered, and dried in the extruder 1 shown in FIG. 1. Thereby, the hydrogenated nitrile rubber as a solid was recovered.

The extruder 1 used was a biaxial meshing type screw extruder including two screws (cylinder diameter: 47 mm, L/Da: 63) 5 and 5 disposed in parallel inside the barrel 3 to be rotatably driven in the same direction while crest portions of one screw were meshed with root portions of the other screw and root portions of the one screw were meshed with crest portions of the other screw.

The axial screw length L1 of the region defining the coagulation zone 100 was 931 mm, the axial screw length L2 of the region defining the drainage zone 102 was 161 mm, the axial screw length L3 of the region defining the washing/dewatering zone 104 was 678 mm, and the axial screw length L4 of the region defining the drying zone 106 was 1058 mm.

In Example 1, the two screws 5 and 5 had screw configurations shown below. For the setting temperatures of the barrel blocks, the barrel blocks 31 to 39 were set at 90° C., the barrel blocks 40 to 43 were set at 130 to 140° C., and the barrel blocks 44 to 48 were set at 120 to 130° C.

screw configuration of the barrel block 38: "BAAAAC"
screw configuration of the barrel block 40: "DDDDAA"

To be noted, "A" indicates a forward feed kneading disk, "B" indicates a neutral kneading disk, "C" indicates a backward feed kneading disk, and "D" represents a full flight screw. In other words, the screw configuration of the portion corresponding to the washing water feed port 380 is composed of a plurality of kneading disks, and the proportion of the kneading disks (proportion in the length direction) in the barrel block 38 in the screw is 100%.

In the extruder 1 having such a configuration, the latex (L1) of hydrogenated nitrile rubber having a pH adjusted to 3.6 was stared to be continuously fed at a rate of 370 kg/hr (a rate of 50 kg/hr in terms of the hydrogenated nitrile rubber) from the feed port 320 disposed in the barrel block 32. At the same time, the sodium chloride aqueous solution (coagulant concentration: 25 wt %) was started to be continuously fed at a rate of 120 kg/hr from the feed porgy 321 disposed in the barrel block 32, and the water vapor was started to be continuously fed at a pressure of 0.35 MPa and a rate of 80 kg/hr from the feed porgy 322 disposed in the barrel block 32. In other words, the concentration of the coagulant relative to the total amount of serum water when passing through the feed port 321 [amount of sodium chloride/(amount of serum water caused from the total feed)] was 5.8 wt %, and the amount of sodium chloride was set to 60 parts relative to 100 parts of the hydrogenated nitrile rubber. At the same time, the washing water having a temperature of 60° C. was continuously fed at 350 L/hr from the feed port 380 disposed in the barrel block 38, and the extruder 1 was operated at a the number of rotations of the screw of 280 rpm. Thus, by continuously coagulating, washing, dewatering, and drying the latex (L1) of hydrogenated nitrile rubber, the hydrogenated nitrile rubber as a solid was continuously recovered at a rate of 48 kg/hr. In this operation, the water pressure of the washing water fed from the washing water feed port 380 disposed in the barrel block 38 was measured with a water pressure gage disposed in the vicinity of the washing water feed port 380. It was 4.0 MPa. In Example 1, Q (feed rate of hydrogenated nitrile rubber)/N (number of rotations of screw) was 0.18.

According to the methods described above, occurrence of fouling in the vent ports 430 during the operation to recover the hydrogenated nitrile rubber in the extruder 1 was evaluated, and the recovered hydrogenated nitrile rubber was measured for the Mooney viscosity (polymer Mooney), the maximum value of the chemiluminescent intensity, and the volatile matter content. The results are shown in Table 1.

In the next step, in a Banbury mixer, 100 parts of MT carbon (available from Cancarb Limited, trade name "Thermax MT", thermal black), 20 parts of tri-2-ethylhexyl trimellitate (available from ADEKA CORPORATION, trade name "ADEKA CIZER C-8", plasticizer), 1.5 parts of 4,4'-di-($\alpha,\alpha$-dimethylbenzyl)diphenylamine (available from Ouchi Shinko Chemical Industrial Co., Ltd., trade name "NOCRAC CD", antiaging agent), 1 part of stearic acid, and 1 part of polyoxyethylene alkyl ether phosphoric acid ester (available from Toho Chemical Industry, Co., Ltd., trade name "Phosphanol RL210", processing aid) were added to 100 parts of the recovered hydrogenated nitrile rubber, and these were mixed at 50° C. for 5 minutes. Then, the resulting mixture was transferred to a roll at 50° C., and was compounded with 4 parts of a mixture of the dicyclohexylamine salt of ethylene glycol and long-chain alcohols (available from Ouchi Shinko Chemical Industrial Co., Ltd., trade name "NOCMASTER EGS", consisting of 80 wt % of a dicyclohexylamine salt of ethylene glycol and 20 wt % of long-chain alcohols (1-tetradecanol, 1-hexadecanol, and 1-octadecanol), basic cross-linking accelerator) and 2.2 parts of hexamethylenediamine carbamate (available from Dupont Dow Elastomers LLC, trade name "Diak #1", polyamine cross-linking agent belonging to aliphatic polyvalent amines), and was kneaded to prepare a rubber composition.

By the methods described above, the resulting rubber composition was measured for the Mooney viscosity (compound Mooney), and was evaluated for the metal mold fouling properties. The results are shown in Table 1.

Example 2

A latex containing the hindered phenol-based antiaging agent (solids content: 13.5 wt %) was prepared in the same manner as in Example 1 except that 4,6-bis(octylthiomethyl)-o-cresol as the hindered phenol-based antiaging agent as it was, rather than in the form of an emulsion, was added to the latex (L1) of hydrogenated nitrile rubber prepared in Production Example 1. The pH of the resulting latex containing the hindered phenol-based antiaging agent was adjusted to 3.6 (solids content: 13.5 wt %) with a sulfuric acid aqueous solution. Thereafter, by coagulating, washing, dewatering, and drying the latex (L1) of hydrogenated nitrile rubber in the same manner as in Example 1, the hydrogenated nitrile rubber as a solid was continuously recovered at a rate of 48 kg/hr. The recovered hydrogenated nitrile rubber was evaluated in the same manner as in Example 1, and was prepared into a rubber composition in the same manner as in Example 1. The resulting rubber composition was evaluated in the same manner as in Example 1. The results are shown in Table 1.

Example 3

A latex containing the hindered phenol-based antiaging agent (solids content: 13.5 wt %) was prepared in the same manner as in Example 1 except that an emulsion of 4,6-bis(octylthiomethyl)-o-cresol prepared in the same manner as in Example 1 was added to the latex (L1) of hydrogenated nitrile rubber prepared in Production Example 1 such that the amount of 4,6-bis(octylthiomethyl)-o-cresol added as a hindered phenol-based antiaging agent was 1.5 parts relative to 100 parts of solids in the latex. The pH of the resulting latex containing the hindered phenol-based antiaging agent was adjusted to 3.6 (solids content: 13.5 wt %) with a sulfuric acid aqueous solution. Thereafter, by coagulating, washing, dewatering, and drying the latex (L1) of hydrogenated nitrile rubber in the same manner as in Example 1, the hydrogenated nitrile rubber as a solid was continuously recovered at a rate of 48 kg/hr. The recovered hydrogenated nitrile rubber was evaluated in the same manner as in Example 1, and was prepared into a rubber composition in the same manner as in Example 1. The resulting rubber composition was evaluated in the same manner as in Example 1. The results are shown in Table 1.

Example 4

A latex containing the hindered phenol-based antiaging agent (solids content: 13.5 wt %) was prepared in the same manner as in Example 1 except that an emulsion of 4,6-bis(octylthiomethyl)-o-cresol prepared in the same manner as in Example 1 such that the amount of 4,6-bis(octylthiomethyl)-o-cresol added as a hindered phenol-based antiaging agent was 2.2 parts relative to 100 parts of solids in the latex was added to the latex (L1) of hydrogenated nitrile rubber prepared in Production Example 1. The pH of the resulting latex containing the hindered phenol-based antiaging agent was adjusted to 3.6 (solids content: 13.5 wt %) with a sulfuric acid aqueous solution. Thereafter, by coagulating, washing, dewatering, and drying the latex (L1) of hydrogenated nitrile rubber in the same manner as in Example 1, the hydrogenated nitrile rubber as a solid was continuously recovered at a rate of 48 kg/hr. The recovered hydrogenated nitrile rubber was evaluated in the same manner as in Example 1, and was prepared into a rubber composition in the same manner as in Example 1. The resulting rubber composition was evaluated in the same manner as in Example 1. The results are shown in Table 1.

Example 5

A latex containing the hindered phenol-based antiaging agent (solids content: 13.5 wt %) was prepared in the same manner as in Example 1 except that an emulsion of 4,6-bis(octylthiomethyl)-o-cresol prepared in the same manner as in Example 1 such that the amount of 4,6-bis(octylthiomethyl)-o-cresol added as a hindered phenol-based antiaging agent was 0.3 parts relative to 100 parts of solids in the latex was added to the latex (L1) of hydrogenated nitrile rubber prepared in Production Example 1. The pH of the resulting latex containing the hindered phenol-based antiaging agent was adjusted to 3.6 (solids content: 13.5 wt %) with a sulfuric acid aqueous solution. Thereafter, by coagulating, washing, dewatering, and drying the latex (L1) of hydrogenated nitrile rubber in the same manner as in Example 1, the hydrogenated nitrile rubber as a solid was continuously recovered at a rate of 48 kg/hr. The recovered hydrogenated nitrile rubber was evaluated in the same manner as in Example 1, and was prepared into a rubber composition in the same manner as in Example 1. The resulting rubber composition was evaluated in the same manner as in Example 1. The results are shown in Table 1.

Example 6

An emulsion of a hindered phenol-based antiaging agent was added to the latex (L1) of hydrogenated nitrile rubber prepared in Production Example 1, the emulsion being prepared by dispersing 0.8 parts of pentaerythritol-tetrakis (3-(3,5-di-t-butyl-4-hydroxyphenyl) propionate) (available from BASF Japan Ltd., trade name "Irganox 1010", molecular weight: 1177.6) in 1.5 parts of an aqueous solution of 20 wt % sodium alkylbenzenesulfonate relative to 100 parts by weight of solids in the latex. Thereby, a latex containing the hindered phenol-based antiaging agent (solids content: 13.5 wt %) was prepared. The pH of the resulting latex containing the hindered phenol-based antiaging agent was adjusted to 3.6 (solids content: 13.5 wt %) with a sulfuric acid aqueous solution. Thereafter, by coagulating, washing, dewatering, and drying the latex (L1) of hydrogenated nitrile rubber in the same manner as in Example 1, the hydrogenated nitrile rubber as a solid was continuously recovered at a rate of 48 kg/hr. The recovered hydrogenated nitrile rubber was evaluated in the same manner as in Example 1, and was prepared into a rubber composition in the same manner as in Example 1. The resulting rubber composition was evaluated in the same manner as in Example 1. The results are shown in Table 1.

Example 7

A latex (L1) of hydrogenated nitrile rubber prepared in the same manner as in Example 1 was coagulated, washed, dewatered, and dried except that a latex containing the hindered phenol-based antiaging agent prepared in the same manner as in Example 1 was used and the number of rotations of the screw in the extruder 1 was changed to 330 rpm (i.e., Q/N=0.15). Thereby, the hydrogenated nitrile rubber as a solid was continuously recovered at a rate of 48 kg/hr. The recovered hydrogenated nitrile rubber was evaluated in the same manner as in Example 1, and was prepared into a rubber composition in the same manner as in Example 1. The resulting rubber composition was evaluated in the same manner as in Example 1. The results are shown in Table 1.

Comparative Example 1

The latex (L1) of hydrogenated nitrile rubber prepared in Production Example 1 was used as it was without a hindered phenol-based antiaging agent, and the pH thereof was adjusted to 3.6 (solids content: 13.5 wt %) with a sulfuric acid aqueous solution. Thereafter, by coagulating, washing, dewatering, and drying the latex (L1) of hydrogenated nitrile rubber in the same manner as in Example 1, the hydrogenated nitrile rubber as a solid was continuously recovered at a rate of 48 kg/hr. The recovered hydrogenated nitrile rubber was evaluated in the same manner as in Example 1, and was prepared into a rubber composition in the same manner as in Example 1. The resulting rubber composition was evaluated in the same manner as in Example 1. The results are shown in Table 1.

Comparative Example 2

An emulsion of a polyphenol-based antiaging agent was added to the latex (L1) of hydrogenated nitrile rubber prepared in Production Example 1, the emulsion being prepared by dispersing 0.6 parts of 2,5-di-t-amylhydroquinone (molecular weight: 250.4) relative to 100 parts by weight of solids in the latex in 1.25 parts of an aqueous solution of 20 wt % sodium alkylbenzenesulfonate. Thereby, a latex (solids content: 13.5 wt %) containing a polyphenol-based antiaging agent was prepared. The pH of the resulting latex containing the polyphenol-based antiaging agent was adjusted to 3.6 (solids content: 13.5 wt %) with a sulfuric acid aqueous solution. Thereafter, by coagulating, washing, dewatering, and drying the latex (L1) of hydrogenated nitrile rubber in the same manner as in Example 1 except that the feed rate of the latex of hydrogenated nitrile rubber was changed to 326 kg/hr (44 kg/hr in terms of the hydrogenated nitrile rubber) and the number of rotations of the screw in the extruder 1 was changed to 200 pm (i.e., Q/N=0.22), the hydrogenated nitrile rubber as a solid was continuously recovered at a rate of 42 kg/hr. The recovered hydrogenated nitrile rubber was evaluated in the same manner as in Example 1, and was prepared into a rubber composition in the same manner as in Example 1. The resulting rubber composition was evaluated in the same manner as in Example 1. The results are shown in Table 1.

Comparative Example 3

A latex (solids content: 13.5 wt %) containing a polyphenol-based antiaging agent was prepared in the same manner as in Comparative Example 2 except that 2,5-di-t-butylhydroquinone as a polyphenol-based antiaging agent as it was, rather than in the form of an emulsion, was added to the latex (L1) of hydrogenated nitrile rubber prepared in Production Example 1. The pH of the resulting latex containing the polyphenol-based antiaging agent was adjusted to 3.6 (solids content: 13.5 wt %) with a sulfuric acid aqueous solution. Thereafter, by coagulating, washing, dewatering, and drying the latex (L1) of hydrogenated nitrile rubber in the same manner as in Comparative Example 2, the hydrogenated nitrile rubber as a solid was continuously recovered at a rate of 42 kg/hr. The recovered hydrogenated nitrile rubber was evaluated in the same manner as in Example 1, and was prepared into a rubber composition in the same manner as in Example 1. The resulting rubber composition was evaluated in the same manner as in Example 1. The results are shown in Table 1.

Comparative Example 4

A latex (solids content: 13.5 wt %) containing the hindered phenol-based antiaging agent was prepared in the same manner as in Example 1 except that an emulsion of 4,6-bis(octylthiomethyl)-o-cresol prepared in the same manner as in Example 1 was added to the latex (L1) of hydrogenated nitrile rubber prepared in Production Example 1 such that the amount of 4,6-bis(octylthiomethyl)-o-cresol added as a hindered phenol-based antiaging agent was 4.0 parts relative to 100 parts of solids in the latex. The pH of the resulting latex containing the hindered phenol-based antiaging agent was adjusted to 3.6 (solids content: 13.5 wt %) with a sulfuric acid aqueous solution. Thereafter, by coagulating, washing, dewatering, and drying the latex (L1) of hydrogenated nitrile rubber in the same manner as in Example 1 except that the number of rotations of the screw in the extruder 1 was changed to 200 rpm (i.e., Q/N=0.25), the hydrogenated nitrile rubber as a solid was continuously recovered at a rate of 48 kg/hr. The recovered hydrogenated nitrile rubber was evaluated in the same manner as in Example 1, and was prepared into a rubber composition in the same manner as in Example 1. The resulting rubber composition was evaluated in the same manner as in Example 1. The results are shown in Table 1.

Comparative Example 5

A latex (solids content: 13.5 wt %) containing a monophenol-based antiaging agent was prepared by adding 0.6 parts of 2,6-di-t-butyl-4-methylphenol (available from Ouchi Shinko Chemical Industrial Co., Ltd., trade name "NOCRAC 200", molecular weight: 220.4) as a monophenol-based antiaging agent as it was to the latex (L1) of hydrogenated nitrile rubber prepared in Production Example 1 relative to 100 parts by weight of solids in the latex. Thereafter, by adjusting the pH of the resulting latex containing a monophenol-based antiaging agent to 3.6 (solids content: 13.5 wt %) with a sulfuric acid aqueous solution, and coagulating, washing, dewatering, and drying the latex (L1) of hydrogenated nitrile rubber in the same manner as in Example 1 except that the number of rotations of the screw in the extruder 1 was changed to 200 rpm (i.e., Q/N=0.25), the hydrogenated nitrile rubber as a solid was continuously recovered at a rate of 48 kg/hr. The recovered hydrogenated nitrile rubber was evaluated in the same manner as in Example 1, and was prepared into a rubber composition in the same manner as in Example 1. The resulting rubber composition was evaluated in the same manner as in Example 1. The results are shown in Table 1.

TABLE 1

| | | Example | | | | | | |
|---|---|---|---|---|---|---|---|---|
| | | 1 | 2 | 3 | 4 | 5 | 6 | 7 |
| Antiaging agent | | Hindered phenol-based (Irganox 1520L) | Hindered phenol-based (Irganox 1520L) | Hindered phenol-based (Irganox 1520L) | Hindered phenol-based (Irganox 1520L) | Hindered phenol-based (Irganox 1520L) | Hindered phenol-based (Irganox 1010) | Hindered phenol-based (Irganox 1520L) |

TABLE 1-continued

| | | | | | | | |
|---|---|---|---|---|---|---|---|
| Molecular weight of antiaging agent | 424.8 | 424.8 | 424.8 | 424.8 | 424.8 | 1177.6 | 424.8 |
| Amount of antiaging agent added (relative to 100 parts of rubber) [parts] | 0.8 | 0.8 | 1.5 | 2.2 | 0.3 | 0.8 | 0.8 |
| Form of antiaging agent added | Emulsion | As it is | Emulsion | Emulsion | Emulsion | Emulsion | Emulsion |
| Feed rate Q [kg/hr] of hydrogenated nitrile rubber | 50 | 50 | 50 | 50 | 50 | 50 | 50 |
| Number of rotations N [rpm] of screw | 280 | 280 | 280 | 280 | 280 | 280 | 330 |
| Q/N [kg/(hr · rpm)] | 0.18 | 0.18 | 0.18 | 0.18 | 0.18 | 0.18 | 0.15 |
| Maximum value of chemiluminescent intensity [counts/sec] in hydrogenated nitrile rubber | 12000 | 16000 | 7000 | 5000 | 22000 | 18000 | 23000 |
| Volatile matter content [wt %] in hydrogenated nitrile rubber | 0.34 | 0.34 | 0.37 | 0.39 | 0.30 | 0.37 | 0.29 |
| Mooney viscosity (polymer Mooney) of hydrogenated nitrile rubber | 51 | 51 | 51 | 49 | 52 | 52 | 51 |
| Mooney viscosity (compound Mooney) of rubber composition | 91 | 95 | 87 | 86 | 105 | 96 | 107 |
| Fouling in extruder (pollution of vent ports) | A | A | A | A | A | A | A |
| Fouling in metal mold | A | B | A | B | A | A | A |

| | Comparative Example | | | | |
|---|---|---|---|---|---|
| | 1 | 2 | 3 | 4 | 5 |
| Antiaging agent | — | Polyphenol-based (2,5-di-t-amylhydroquinone) | Polyphenol-based (2,5-di-t-amylhydroquinone) | Hindered phenol-based (Irganox 1520L) | Monophenol-based (NOCRAC 200) |
| Molecular weight of antiaging agent | — | 250.4 | 250.4 | 424.8 | 220.4 |
| Amount of antiaging agent added (relative to 100 parts of rubber) [parts] | 0 | 0.6 | 0.6 | 4.0 | 0.6 |
| Form of antiaging agent added | — | Emulsion | As it is | Emulsion | As it is |
| Feed rate Q [kg/hr] of hydrogenated nitrile rubber | 50 | 44 | 44 | 50 | 50 |
| Number of rotations N [rpm] of screw | 280 | 200 | 200 | 200 | 200 |
| Q/N [kg/(hr · rpm)] | 0.18 | 0.22 | 0.22 | 0.25 | 0.25 |
| Maximum value of chemiluminescent intensity [counts/sec] in hydrogenated nitrile rubber | 45000 | 27000 | 30000 | 3500 | 28000 |
| Volatile matter content [wt %] in hydrogenated nitrile rubber | 0.37 | 0.81 | 0.84 | 0.42 | 0.41 |
| Mooney viscosity (polymer Mooney) of hydrogenated nitrile rubber | 58 | 51 | 52 | 51 | 53 |
| Mooney viscosity (compound Mooney) of rubber composition | 135 | 113 | 115 | 85 | 115 |
| Fouling in extruder (pollution of vent ports) | A | C | C | A | F |
| Fouling in metal mold | A | A | B | F | A |

Table 1 shows that when the hydrogenated nitrile rubbers as a solid were recovered from the lattices of hydrogenated nitrile rubber by feeding the lattices of hydrogenated nitrile rubber into the extruder, each latex containing 0.1 to 3 parts of a hindered phenol-based antiaging agent having a molecular weight of 300 to 3000 relative to 100 parts of the hydrogenated nitrile rubber in the latex, fouling in the extruder was suppressed, the resulting rubber compositions had a low Mooney viscosity (compound Mooney) and had high processability, and occurrence of fouling in the metal mold during forming and cross-linking was effectively suppressed (Examples 1 to 7).

In contrast, when the latex of hydrogenated nitrile rubber was fed to the extruder without a hindered phenol-based antiaging agent having a molecular weight of 300 to 3000, the resulting rubber composition had a high Mooney viscosity (compound Mooney) and had poor processability (Comparative Example 1).

When an antiaging agent other than the hindered phenol-based antiaging agent having a molecular weight of 300 to 3000 was used instead of the hindered phenol-based antiaging agent having a molecular weight of 300 to 3000, fouling in the extruder occurred and the productivity was reduced (Comparative Examples 2, 3, and 5).

When a significantly large amount of the hindered phenol-based antiaging agent having a molecular weight of 300 to 3000 was used, fouling in the metal mold during forming and cross-linking occurred, and the productivity was reduced (Comparative Example 4).

The invention claimed is:

1. A method for producing a nitrile rubber, comprising recovering a nitrile rubber from a latex of nitrile rubber by continuously feeding the latex of nitrile rubber and a coagulant into an extruder including a screw disposed inside a barrel to be rotatably driven,
   wherein the method further comprises adding a hindered phenol-based antiaging agent, having a molecular weight of 300 to 3000, in the form of an emulsion to the latex of nitrile rubber such that the latex of nitrile rubber fed into the extruder contains 0.1 to 3 parts by weight of the hindered phenol-based antiaging agent relative to 100 parts by weight of the nitrile rubber.

2. The method for producing a nitrile rubber according to claim 1, wherein the nitrile rubber discharged from the extruder and recovered from the latex of nitrile rubber has a maximum value of chemiluminescent intensity of 2,000 to 25,000 counts/sec, which is measured according to JIS K7351:2018.

3. The method for producing a nitrile rubber according to claim 1, wherein the nitrile rubber contains 5 to 60 wt % of $\alpha,\beta$-ethylenically unsaturated nitrile monomer units, and has an iodine value of 120 or less.

4. The method for producing a nitrile rubber according to claim 1, wherein the ratio Q/N [kg/(hr·rpm)] of the feed rate Q [kg/hr] of the nitrile rubber fed to the extruder to the number N of rotations [rpm] of the screw in the extruder is controlled to 0.22 kg/(hr·rpm) or less.

5. The method for producing a nitrile rubber according to claim 1, wherein the emulsion of the hindered phenol-based antiaging agent comprises an emulsifier.

6. The method for producing a nitrile rubber according to claim 5, wherein the emulsifier is an anionic emulsifier.

* * * * *